(12) United States Patent
Jenab

(10) Patent No.: US 7,704,911 B2
(45) Date of Patent: Apr. 27, 2010

(54) CATALYTIC COMPOSITION FOR OXIDATION OF HYDROGEN SULFIDE, AND METHODS FOR PREPARATION THEREOF

(75) Inventor: Masih Hosseini Jenab, Tehran (IR)

(73) Assignee: Research Institute of Petroleum Industry (RIPI), Tehran (IR)

( * ) Notice: Subject to any disclaimer, the term of this patent is extended or adjusted under 35 U.S.C. 154(b) by 967 days.

(21) Appl. No.: 11/271,664

(22) Filed: Nov. 10, 2005

(65) Prior Publication Data
US 2006/0128560 A1 Jun. 15, 2006

(30) Foreign Application Priority Data
Nov. 10, 2004 (EP) .................................. 04105674

(51) Int. Cl.
*B01J 31/00* (2006.01)
*B01J 27/24* (2006.01)
(52) U.S. Cl. ....................... 502/150; 502/159; 502/162; 502/170; 502/171; 502/200
(58) Field of Classification Search ................. 502/150, 502/159, 162, 170, 171, 200
See application file for complete search history.

(56) References Cited

U.S. PATENT DOCUMENTS

| | | | |
|---|---|---|---|
| 3,767,689 A | 10/1973 | Donovan et al. | |
| 4,189,462 A * | 2/1980 | Thompson | ............... 423/576.6 |
| 4,218,342 A | 8/1980 | Thompson | |
| 4,364,871 A | 12/1982 | Svatek et al. | |
| 4,374,104 A | 2/1983 | Primack | |

* cited by examiner

*Primary Examiner*—Jerry Lorengo
*Assistant Examiner*—James E McDonough
(74) *Attorney, Agent, or Firm*—Kenyon & Kenyon LLP

(57) ABSTRACT

The present invention provides a catalytic composition for use in an oxidation-reduction process for effecting the catalytic oxidation of hydrogen sulfide in gas strains comprising a water soluble iron compound, a mixture of two chelating agents, comprising $Na_2EDTA$ and $Na_4EDTA$, and at least one stabilizer. Further the present invention provides a process for preparing the catalytic composition according to the invention, said composition being advantageous in effecting the catalytic oxidation of hydrogen sulfide in gas strains, comprising the steps of preparing a mixture of a water soluble iron compound and a stabilizing agent in an aqueous system, while the pH of the system is pH $\leq 2$, adding a mixture of two chelating agents I and II, whereas both of the chelating agents are amine chelating agents to the mixture of the water soluble iron compound and a stabilizing agent, adding sufficient aqueous amine chelating agent II to this combined mixture to adjust a pH of 7 to 10, and heating this mixture of to get the desired concentration of chelated iron in the mixture. Therefore, the procedure of the present invention provides an alkaline aqueous chelated iron solution useful in oxidation-reduction processes for effecting the catalytic oxidation of hydrogen sulfide in gas strains and provides, as mentioned before, (1) no foaming and no sludge, (2) a minimum decomposition of the chelant during the reaction, (3) a homogeneous and very concentrated catalytic iron chelate reagent with a possible iron concentration of >40 wt % and (4) a minimum rate of absorption of $CO_2$ into the solution and maximum rate of stripping of $CO_2$ by air bubbling.

12 Claims, No Drawings

CATALYTIC COMPOSITION FOR OXIDATION OF HYDROGEN SULFIDE, AND METHODS FOR PREPARATION THEREOF

CROSS-REFERENCE TO RELATED APPLICATIONS

This application claims the benefit of European patent application Ser. No. 04105674.8, filed Nov. 10, 2004, the contents of which is incorporated herein by reference.

FIELD OF THE INVENTION

The invention relates to a novel catalytic composition for use in an oxidation-reduction process for effecting the catalytic oxidation of hydrogen sulfide in gas strains and a improved method for preparing such a catalytic composition.

BACKGROUND OF THE INVENTION

The use of polyvalent metal chelates in general, and of iron chelates in particular, is well known for the removal of $H_2S$ from sour gas or liquid streams. According to such oxidation-reduction processes hydrogen sulfide gas is removed from a gaseous fluid stream by a continuous catalytic oxidation-reduction system utilizing a ferric iron chelate to catalytically oxidize the hydrogen sulfide and recover elemental sulfur. That is, hydrogen sulfide is converted to elemental sulfur and the ferric chelate is reduced to the ferrous state. The ferrous chelate is subsequently oxidized again to the ferric state to continuously regenerate the ferric iron chelate catalyst.

However, chelating agents on basis of polyamino-polyacids do not show satisfactory results because they do not operate efficiently at the high pH levels which are required to obtain good absorption of hydrogen sulfide and permit loss of iron as a precipitate of ferric hydroxide and/or ferrous sulfide from the reaction solution. Furthermore, it is generally necessary to add, for example, alkaline metal salts to the system to maintain the operating solution at the desired high pH. This means that there will be a pH value within the operating solution, which exceeds the pH level at which EDTA per Fe is effective. As a result, iron precipitates during the preparation of the solution. Still further, if a base, such as sodium carbonate, is added to a hot iron-EDTA chelate solution, it leads to the formation of foam due to undesired side reactions.

U.S. Pat. No. 4,218,342 discloses a method for preparing an stabilizing iron chelate for use in a scrubbing solution or removing hydrogen sulfide from a gas stream, at a pH of between 5.5 and 13, by combination of two chelate agents such as polyamino polycarbonic acids and of polyhydroxy compounds. During the preparation of the concentrated iron chelate solution, tetrasodium EDTA ($Na_4EDTA$) having a pH of between 11.5 to 13 (as a 5% aqueous solution), is added to a concentrated iron salt solution to form a concentrated iron chelate solution suited for economical transport, storage and make-up in a practical commercial operation. Results show that using this method, some of the iron precipitates, while preparing concentrated solution.

U.S. Pat. Nos. 4,364,871 and 3,767,689, shows that while using methods for preparing aqueous solutions of iron chelates of aminopolycarboxylic acids, the attempts to oxidize the ferrous state to the ferric state by bubbling air through the reaction mixture during the reaction at elevated temperatures apparently decomposes the aminopolycarboxylic acid. That results in the decrease of the amount of free EDTA present in the reaction mixture due to degradation of EDTA during the heat cycle.

In most of the waste streams, the concentration of hydrogen sulfide is relatively low, namely in the order of a few parts per million (ppm) to a few percent. The concentration of carbon dioxide, on the other hand, is relatively higher, in the order of some percent and even up to about 98 percents. If carbon dioxide is present during the operation of the system and treatment of the gas stream, the pH of the solution decreases rapidly in the absorber column due to the absorption of carbon dioxide in the reaction solution. In turn, when the gas stream contacts the ferric iron chelate to oxidize the hydrogen sulfide to elemental sulfur by formation of the ferrous state, the pH value of solution returns slowly to its initial state in the oxidizer zone wherein the ferrous ions are formed and are continuously oxidized to ferric ions, resulting from contact with oxygen.

There is a need in the art for a catalytic composition (and methods of preparation thereof) for removing hydrogen sulfide from a gaseous fluid stream which avoids the above mentioned difficulties.

SUMMARY OF THE INVENTION

In one embodiment, the present invention provides a catalytic composition for oxidation of hydrogen sulfide comprising:
  i. a water soluble iron compound;
  ii. a mixture of two chelating agents, comprising ethylenediaminetetraacetic acid disodium salt ($Na_2EDTA$) and ethylenediaminetetraacetic acid tetrasodium salt ($Na_4EDTA$), and
  iii. at least one stabilizer.

In another embodiment, the present invention provides a method for preparing a catalytic composition for oxidation of hydrogen sulfide comprising the steps of:
  a) preparing a mixture of a water soluble iron compound and a stabilizing agent in an aqueous system at a pH of less than or equal to 2;
  b) combining a mixture of two amine chelating agents I and II with that obtained in the previous step;
  c) combining amine chelating agent II to the mixture to obtain a pH of 7 to 10; and
  d) heating the pH adjusted mixture.

In another embodiment, the present invention provides the catalytic composition prepared by the above method.

DETAILED DESCRIPTION OF THE INVENTION

The present invention further provides a catalytic composition for use in an oxidation-reduction process for effecting the catalytic oxidation of hydrogen sulfide in gas strains, comprising a water soluble iron compound, a mixture of two chelating agents, whereas both of the chelating agents are amine chelating agents, and at least one stabilizer.

The present invention further provides a process for preparing the catalytic composition according to the invention, said composition being advantageous in effecting the catalytic oxidation of hydrogen sulfide in gas strains. The process according to the invention comprises the steps of:
  a) preparing a mixture of a water soluble iron compound and a stabilizing agent in an aqueous system, while the pH of the system is pH $\leq 2$;
  b) adding a mixture of two chelating agents I and II, whereas both of the chelating agents are amine chelating agents to the mixture of step a);
  c) adding sufficient aqueous amine chelating agent II to the mixture of step b) to adjust a pH of 7 to 10; and d) heating the mixture of step c) to get the desired concentration of chelated iron in the mixture.

The catalytic composition of the present invention could be used as a catalyst in an oxidation-reduction process for effecting the catalytic oxidation of hydrogen sulfide in gas strains with the advantages that in the catalytic process 1. there appears no foaming;
2. sludge formation is avoided
3. there appears only a minimum decomposition of the chelate during the reaction,
4. a homogeneous and very concentrated catalytic iron chelate reagent can be provided
5. a minimum rate of absorption of $CO_2$ into the solution and a maximum rate of stripping of $CO_2$ by air bubbling can be achieved.

The catalytic composition of the present invention includes the combination of two chelating agents comprising $Na_2EDTA$ and $Na_4EDTA$, a stabilizer and an iron sulfate, wherein for pH adjustment $Na_4EDTA$ is used.

When making the catalytic composition according to the invention, there results a homogeneous, very concentrated alkaline aqueous chelated iron solution which can be used in the catalytic oxidation of hydrogen sulfide in gas streams, particularly in gas streams containing high amounts of carbon dioxide after dilution.

As mentioned before, the new catalytic composition according to the invention, useful within an oxidation-reduction process for effecting the catalytic oxidation of hydrogen sulfide in gas strains, comprises b) a water soluble iron compound,
c) a mixture of two chelating agents, comprising $Na_2EDTA$ and $Na_4EDTA$, and
d) at least one stabilizer, wherein for pH adjustment $Na_4EDTA$ is used.

The iron compound used in the present invention could be for example iron sulfate, iron nitrate or iron chloride. Preferably, the iron compound is an iron sulfate. The iron sulfate used in the present invention could be $Fe_2(SO_4)_3.5H_2O$ which is also known as Iron(III) sulfate pentahydrate or ferric sulfate pentehydrate. Such a compound is commercially available.

The stabilizers in the present invention could be polyhydroxy chelating agents such as sugars or reduced sugars. They are neutral materials and do not lead significantly to a control of the pH value of the reaction solution. These types of chelating agents are particularly effective in avoiding the formation and precipitation of insoluble iron compounds by forming complexes with the ferric ions in the reaction solution. The stabilizers are in particular selected from one or more out of the group consisting of polyhydroxy chelating agents, monosaccharides, disaccharides, reduced monosaccharides, reduced disaccharides, monosaccharide acids and disaccharide acids, and any of their alkali metal salts. In accordance with the present invention mannitol or sorbitol are preferably used, with water soluble sorbitol being most preferred.

According to the process of the present invention, preferably the mixture of the iron sulfate and a stabilizing agent is heated to a temperature of from 75° C. to 90° C. before the mixture of the two chelating agents I and II is added. According to the present invention, the $Fe^{3+}$/stabilizer agent ratio could be between 1.5 to 2.

Preferably, the mixture of an iron sulfate and a stabilizing agent in an aqueous system is prepared, while the pH of the system is pH $\leq 2$. The pH can be lowered using sulfuric acid solutions, if necessary. For final adjustment of the pH value of the composition, however, $Na_4EDTA$ is used to reach an alkaline pH. The pH value is preferably in the range of from 7 to 10 and more preferred from 8 to 8.5.

Suitable amine chelating agents in the process of the present invention include the polyamino polycarboxylic acids, polyaminoalkyl polycarboxylic acids, polyaminohydroxyalkyl polycarboxylic acids, and polyphosphonoalkyl amines, such as the polyphosphonometyl amines, the latter being phosphorus analogs of the polyamino polycarboxylic acids and the salts thereof. Preferable aminopolycarboxylic acids in the present invention as the chelant are for example ethylene-diamine-tetra-acetic acid (EDTA.4H), ethylene-diaminine-tetraacetic acid disodium salt ($Na_2.EDTA$) and ethylene-diamine-tetra-acetic acid tetrasodium salt ($Na_4.EDTA$). Ethylene-diamine-tetra-acetic acid and its salts are commercially available as solid materials. EDTA.4H and $Na_2.EDTA$ are slightly soluble in water, however, $Na_4.EDTA$ is highly soluble in water. Preferably, the ratio of chelating agent I to chelating agent II in the mixture comprising both agents is between 0.56 to 0.70 before being added to the mixture of the iron sulfate and the stabilizing agent. Further, the pH value of the mixture of the two chelating agents I and II is preferable between 8 to 8.5. The chelating agent I is preferably ethylene-diamine-tetra-acetic acid disodium salt ($Na_2EDTA$) and the chelating agent II is preferably ethylene-diamine-tetra-acetic acid tetrasodium salt ($Na_4EDTA$).

According to the invention, each mole of iron from the iron sulfate may be contacted with 2 to 2.5 moles of the total of $Na_2.EDTA$ and $Na_4.EDTA$. The molar ratio of $Na_2.EDTA$ to $Na_4.EDTA$ in an aqueous mixture can be 14:86, preferably 18:82 and more preferred 36:64.

The present invention also refers to a method for preparing a catalytic composition, as shown above. The method comprises process steps a) to d).

The iron compound used during the method is preferably iron(III) sulfate and most preferably $Fe_2(SO_4)_3.5H_2O$. A suitable stabilizer agent is selected from the group of polyhydroxy chelating agents, consisting of monosaccharides, disaccharides, reduced monosaccharides, reduced disaccharides, monosaccharide acids and disaccharide acids, and their alkali metal salts. In a preferred method the stabilizer agent is sorbitol.

During the process, the $Fe^{3+}$/stabilizer agent ratio can be between 1.5 to 2. In a preferred method, the mixture of step a) above is heated to a temperature of 75° C. to 90° C. before combination with the mixture of the two chelating agents I and II. Preferably, the ratio of chelating agent I to chelating agent II is between 0.56 to 0.70. The pH value of the mixture of the two chelating agents I and II can be in a range between 8 to 8.5.

Suitable amine chelating agents are aminopolycarboxylic acids and salts thereof and preferably ethylenediaminetetraacetic acids (EDTA), most preferred the iron chelating agent I is ethylenediaminetetraacetic acid disodium salt ($Na_2EDTA$) and the iron chelating agent II is ethylenediaminetetraacetic acid tetrasodium salt ($Na_4EDTA$).

In a method for producing the catalyst composition, each mole of iron (from iron sulfate) is contacted with 2 to 2.5 moles of the total amount of $Na_2EDTA$ and $Na_4EDTA$. The molar ratio of $Na_2EDTA$ to $Na_4EDTA$ in aqueous mixture can be from 14 to 86, preferably from 18 to 82 and more preferred from 36 to 64. In a preferred method, the highly concentrated iron chelate complex has a desirable concentration of greater than 40 wt % iron.

Making use of the method according to the invention, there results a catalytic composition that is homogeneous, without any precipitation of ferric hydroxide during the reaction. The iron chelate complex undergoes a minimum of chelate decomposition during formation of the solution. Still further, the preparation of the alkaline aqueous chelated iron solution undergoes no foaming and no sludge formation.

The rate of absorption of carbon dioxide present in gas streams into the solution is relatively low and the rate of stripping $CO_2$ from iron chelate by air bubbling is relatively high during operation.

The catalytic composition according to the invention can be used during catalytic oxidation of hydrogen sulfide in gas streams containing high amounts of carbon dioxide. A high concentration of iron in a iron chelate solution for the oxidation of hydrogen sulfide in gas streams containing high amounts of carbon dioxide can be achieved.

According to an preferred embodiment of the present invention, the method for producing the catalytic composition may include mixing a mixture of aqueous iron (III) sulfate and sorbitol with a mixture of aqueous ethylene-di-amine-tetra-acetic-acid disodium salt ($Na_2$.EDTA) and ethylene-diamine-tetra-acetic-acid tetrasodium salt ($Na_4$.EDTA) having a pH of about 8.5, and introducing additional $Na_4$.EDTA to adjust the pH such that the amount of iron per mole EDTA is below 1, resulting in an operating solution having the desired pH, which pH value is preferably in the range between 7 and 10. The mixture is then heated. This preferred embodiment provides (1) a completely homogeneous solution without precipitation during the reaction, (2) the preparation of a very concentrated iron chelate solution with (3) no foaming and no sludge formation during the preparation and (4) a minimum of chelant decomposition during preparing the concentrated iron solution and (5) a minimum of the rate of carbon dioxide absorption into solution and maximum of rate of $CO_2$ stripping from solution by air bubbling during operation.

It has been found that catalytic solutions of ferric aminopolycarboxylic acids with high concentrations and superior stability can be prepared from an iron compound, a mixture of two chelating agents, comprising $Na_2$EDTA and $Na_4$EDTA, and a stabilizer. In one preferred embodiment of the invention the catalytic solution comprises iron(III) sulfate, sorbitol, mixtures of aminopolycarboxylic acid disodium salt (chelating agents I) and aminopolycarboxylic acid tetrasodium salt (chelating agents II), and the solution is prepared under the conditions disclosed herein.

As an preferred embodiment, the method of the present invention could be performed by employing a mole ratio of $Na_2$.EDTA/$Na_4$.EDTA of about 0.56 to 0.70. When the iron sulfate is completely reacted with the chelate, additional aqueous $Na_4$.EDTA is added to adjust the pH. The mixture could be heated so that mole percent of water is lower than 50%. Finally, the reaction mixture could be then cooled to room temperature.

Therefore, the procedure of the present invention provides an alkaline aqueous chelated iron solution useful in oxidation-reduction processes for effecting the catalytic oxidation of hydrogen sulfide in gas strains and provides, as mentioned before, (1) no foaming and no sludge, (2) a minimum decomposition of the chelant during the reaction, (3) a homogeneous and very concentrated catalytic iron chelate reagent with a possible iron concentration of >40 wt % and (4) a minimum rate of absorption of $CO_2$ into the solution and maximum rate of stripping of $CO_2$ by air bubbling.

The present invention provides an aqueous catalytic solution which is homogeneous, without formation of precipitation of ferric hydroxide during the catalytic reaction. The iron chelate complex undergoes a minimum of the chelate decomposition during manufacture of the solution. Further, the preparation of the alkaline aqueous chelated iron solution undergoes no foaming and no sludge formation. Still further, the rate of absorption of carbon dioxide in gas streams, into the solution relatively low and rate of stripping of $CO_2$ from iron chelate by air bubbling is relatively high during operation.

The catalytic compositions according to the invention are useful in the catalytic oxidation of hydrogen sulfide in gas streams containing high amounts of carbon dioxide. Further, the method of the invention provide catalytic compositions with high concentration of iron for the oxidation of hydrogen sulfide in gas streams containing high amounts of carbon dioxide.

In one embodiment of the present invention, the steps of the method of preparing the iron chelate catalytic solution according to the invention are (1) providing a mixture of iron sulfate and sorbitol in an aqueous system having preferably a pH value of 2 or less, wherein (2) the $Fe^{3+}$/sorbitol ratio is between 1.5 to 2, (3) heating the mentioned mixture to a temperature of about 75° to 90° C., (4) providing a mixture of $Na_2$.EDTA and $Na_4$.EDTA in an aqueous system wherein (5) the $Na_2$.EDTA/$Na_4$.EDTA ratio is between 0.56 to 0.70 wherein (6) the pH of the mixture is between 8 to 8.5, (7) the combination of iron sulfate solution with solution made in during 4, 5 and 6 steps, (8) adding sufficient aqueous $Na_4$.EDTA to adjust a pH value between 7 to 10, and (9) heating the mentioned mixture to get the desired concentration of iron in solution.

The stability against the formation of precipitate during the preparation of the iron chelate solution is determined by passing a diluted solution through a filter. A 150 ml sample of the solution is diluted with 300 ml of deionized water and the resulting solution is passed through a 0.45 micron cellulose acetate filter.

The following Examples explain the invention in more detail without restricting its scope. The skilled person will realize that amendments within the sense of the invention still lead to the advantageous results.

EXAMPLES

Example 1

To a 2 liter beaker aqueous iron(III)sulfate pentahydrate (87.5 g, 0.36 moles Fe) was added and sorbitol (32.5 g, 0.18 moles) then an aqueous mixture of ethylene-diamine-tetra-acetic acid tetrasodium salt and ethylene-diamine-tetra-acetic-acid disodium salt (143.05 g, 0.36 moles) and deionized water (500 g). The pH of the mixture of $Na_2$.EDTA and $Na_4$.EDTA was 8.5. The molar ratio of the chelant: iron was therefore 1.0. With vigorous stirring, the temperature was raised to 80° C. over a period of about 40 minutes, and maintained so long as a clear and homogenous solution is obtained. To the resulting solution then $Na_4$.EDTA (148.7 g, 0.357 moles) was added. The temperature was maintained at 80° C. so that the excess water was evaporated and the volume of the solution amounted to 500 ml. The solution was then cooled. 615.26 grams of the produced chelate solution was obtained. The analysis showed that it contained 40 grams of iron per liter. The final pH of the iron chelates was pH 8.

Example 2

To a 2 liter beaker were added an aqueous iron(III) sulfate pentahydrate (87.5 g, 0.36 moles Fe); sorbitol (32.5 g, 0.18 moles); an aqueous mixture of ethylene-diamine-tetra-acetic-acid tetrasodium salt and ethylene-diamine-tetra-acetic-acid disodium salt (143.05 g, 0.36 moles) and deionized water (500 g). The pH of the mixture of $Na_2$.EDTA and $Na_4$.EDTA was 8.5. The molar ratio of the chelant: iron was therefore 1.0. With vigorous stirring, the temperature was raised to 80° C. over a period of about 40 minutes and maintained as long that a clear and homogeneous solution was obtained. To the resulting solution then Na$_4$.EDTA (228.9 g, 0.55 moles) was added. The temperature was maintained at 80° C., so that the excess of water was evaporated and the volume of the solution amounts 500 ml. The solution was then cooled. 695.46 grams of the produced chelate solution was obtained and found to contain 40 grams of iron per liter. The final pH of the iron chelate was pH 8.5.

Comparative Example 3

To a 2-liter beaker were added an aqueous iron(III) sulfate pentahydrate (87.5 g, 0.36 moles Fe); sorbitol (32.5 g, 0.18 moles); aqueous Na$_4$.EDTA (224.7 g, 0.54 moles) and deionized water (550 g). The molar ratio of chelant: iron was therefore 1.5. With vigorous stirring, the temperature was raised to 80° C. for about 40 minutes and maintained there to obtain a clear and homogeneous solution with a final volume of 500 ml. The solution was then cooled. The produced chelate solution was obtained and found to contain 40 grams per liter of iron. The final pH of the iron chelate amounted to 8.

Comparative Example 4

To a 2 liter beaker were added an aqueous iron(II)sulfate heptahydrate (99.3 g, 0.357 moles Fe); sorbitol (32.5 g, 0.18 moles); aqueous Na$_4$.EDTA (222.6 g, 0.535 moles) and deionized water (550 g). The molar ratio of chelant: iron is therefore 1.5. With vigorous stirring, the temperature was raised to 80° C. in a period of about 40 minutes and maintained there so long that a clear and homogeneous solution was obtained. The temperature was maintained at 80° C. while air bubbling through the solution together with stirring, so that the excess water was evaporated and the volume of the solution was 500 ml. The solution was then cooled. The concentration was determined to contain 40 grams of iron per liter. The final pH of the iron chelate was pH 8.

Comparative Example 5

To a 2 liter beaker were added an aqueous iron(III) sulfate pentahydrate (87.5 g, 0.36 moles Fe); sorbitol (32.5 g, 0.18 moles); aqueous mixture of ethylenediaminetetraacetic acid tetrasodium salt and ethylenediaminetetraacetic acid disodium salt (143.05 g, 0.36 moles) and deionized water (500 g). The pH of mixture of Na$_2$.EDTA and Na$_4$.EDTA was 8.5. The molar ratio of chelant: iron was therefore 1.0. With vigorous stirring, the temperature was raised to 80° C., in a period of about 40 minutes and maintained there so that a clear and homogenous solution was obtained. To the resulting solution was then added Na$_4$.EDTA (79 g, 0.19 moles) to raise pH of solution through pH 7 and then added potassium carbonate (34.2 g, 0.247 moles). The temperature was maintained at 80° C. so that the excess water was evaporated and the volume of the solution amounts to 500 ml. The solution was then cooled. 579.76 grams of product chelate solution was obtained and found to contain 40 grams of iron per liter. The final pH of the iron chelate was pH 8.

Comparative Example 6

To a 2-liter beaker was added an aqueous iron(III) sulfate pentahydrate (87.5 g, 0.36 moles Fe); sorbitol (32.5 g, 0.18 moles); an aqueous mixture of ethylene-diamine-tetraacetic-acid tetrasodiuin salt and ethylene-diamine-tetraacetic acid disodium salt (143.05 g, 0.36 moles) and deionized water (500 g). The pH of the Na$_2$.EDTA and Na$_4$.EDTA mixture was 8.5. The molar ratio of chelant: iron was therefore 1.0. With vigorous stirring, the temperature was raised to 80° C. in a period of about 40 minutes and maintained there so long that a clear and homogeneous solution was obtained. To the resulting solution was then added potassium hydroxide (28 g, 0.5 moles) to raise the pH of solution to 7, and then potassium carbonate (34.2 g, 0.247 moles) was added. The temperature was maintained at 80° C. so that the excess of water was evaporated and the volume of the solution was 500 ml. The solution was then cooled. 528.7 grams of produced chelate solution was obtained and found to contain 40 grams of iron per liter. The final pH of the iron chelate was pH 8.

The chelate solutions of examples 1 to 6 were diluted with water to give a 1.33 percent solution of iron, and filtered through a 0.45-micron mesh cellulose acetate filter. The concentrate solutions of examples 1 to 6 were diluted with sufficient water to provide operating solutions having an iron content of 2000 ppm. These samples were analyzed to determine the amount of EDTA degradation and were then used for testing the effect of absorption of carbon dioxide which results in the decreasing of pH, and effect of stripping of dissolved CO$_2$ by air which results in the increasing of the pH value of the solution.

Table 1 shows the initial foam height during the reaction, the reduction of free EDTA at the end of preparation of iron chelate and the precipitation of iron hydroxide during the reaction. The preparation of final solution took 4 hours.

TABLE 1

| Solution | Initial foam height Upon reaction mm | EDTA decomp. in iron chelate Wt. % | Fe(OH)$_3$ mg. |
|---|---|---|---|
| Example 1 | 0 | 0.04 | 0 |
| Example 3* | 0 | 0.06 | 27 |
| Example 4* | 4 | 1.5 | 23 |
| Example 5* | 25 | 0.1 | 0 |
| Example 6* | 28.5 | 0.1 | 0 |

Table 2 shows the rates of decrease of pH in solution, as a result of blowing CO$_2$ and returning of pH to initial values by bubbling air through solution.

TABLE 2

| Solution | period of changing pH 8 to pH 7 min | period of changing pH 7 to pH 8 min |
|---|---|---|
| Example 1 | 17.4 | 13.9 |
| Example 3* | 10.6 | 29.8 |
| Example 4* | 7.1 | 51.5 |
| Example 5* | 8.1 | 19.5 |
| Example 6* | 6.3 | 37 |

CO$_2$ flow: 100 ml/min., air flow: 530 ml/min., volume of solution: 650 ml.
Iron concentration: 2000 ppm.

From the tables it appears that the catalyst composition according to the invention avoids foaming and leads to no precipitation of iron hydroxide. The results also show that the degradation of the chelate is comparatively less and in addition the time needed for the change of the pH from 8 to 7, which is a result of CO$_2$ absorption is longer, using this solution. The time needed for the pH to return to its initial value, as a result of CO$_2$ stripping by air, is also less.

Table 3 shows advantages of the present invention and disadvantages of the comparative examples that have been provided. The disadvantages of the prior art (Examples 3 to 6) are indicated by using the phrase "disadvantages".

Table 3 also includes the method for preparing each of the mentioned solutions.

TABLE 3

| | | Chelating agent | For raise pH through pH = 7 | For raise pH through pH = 8 or 8.5 | Concentration condition | pH | Height of foam (mm) | Chelant decomposed (%) | Fe(OH)$_3$ Precipitate (mg) | CO$_2$ Absorption (min) | CO$_2$ stripping (min) |
|---|---|---|---|---|---|---|---|---|---|---|---|
| Present invention | Example 1 | Na$_4$.EDTA + Na$_2$.EDTA | Na$_4$.EDTA | Na$_4$.EDTA | Heat | 8 | 0 | 0.04 | 0 | 17.4 advantage | 13.9 advantage |
| | Example 2 | Na$_4$.EDTA + Na$_2$.EDTA | Na$_4$.EDTA | Na$_4$.EDTA | Heat | 8.5 | " | " | " | 17.4 advantage | 13.9 advantage |
| Prior art | Example 3 | Na$_4$.EDTA | Na$_4$.EDTA | Na$_4$.EDTA | Heat | 8 | 0 | 0.06 | 27 disadv. | 10.6 | 29.8 |
| | Example 4 | Na$_4$.EDTA | Na$_4$.EDTA | Na$_4$.EDTA | Heat + Air | 8 | 4 | 1.5 disadv. | 23 disadv. | 7.1 | 51.5 disadv. |
| | Example 5 | Na$_4$.EDTA + Na$_2$.EDTA | Na$_4$.EDTA | K$_2$CO$_3$ | Heat | 8 | 25 disadv. | 0.1 | 0 | 8.1 | 19.5 |
| | Example 6 | Na$_4$.EDTA + Na$_2$.EDTA | KOH | K$_2$CO$_3$ | Heat | 8 | 28.5 disadv. | 0.1 | 0 | 6.3 | 37 |

What is claimed is:

1. A method for preparing a catalytic composition for oxidation of hydrogen sulfide comprising the steps of:
   a) preparing a mixture of a water soluble iron compound and a stabilizing agent in an aqueous system at a pH of less than or equal to 2;
   b) combining a mixture of two amine chelating agents I and II with that obtained in the previous step;
   c) combining amine chelating agent II to the mixture to obtain a pH of 7 to 10; and
   d) heating the pH adjusted mixture;
   wherein an additional base other than an amine chelating agent is not used to adjust the pH.

2. The method of claim 1, wherein the iron compound is iron(III) sulfate.

3. The method of claim 2, wherein the iron(III) sulfate is Fe$_2$(SO$_4$)$_3$.5H$_2$0.

4. The method of claim 1, wherein the stabilizer agent is being selected from the group of polyhydroxy chelating agents, consisting of monosaccharides, disaccharides, reduced monosaccharides, reduced disaccharides, monosaccharide acids and disaccharide acids, and their alkali metal salts.

5. The method of claim 4, wherein the stabilizer agent is sorbitol.

6. The method of claim 1, wherein the Fe$^{3+}$/stabilizer agent ratio is 1.5 to 2.

7. The method of claim 1, wherein the mixture of step a) is heated to a temperature of 75 ° C. to 90 ° C. before combination with the mixture of the two chelating agents I and II.

8. The method of claim 1, wherein the ratio of chelating agent I / chelating agent II is 0.56 to 0.70.

9. The method of claim 1, wherein the pH of the mixture of the two chelating agents I and II is 8 to 8.5.

10. The method of claim 1, wherein the amine chelating agents are aminopolycarboxylic acids and salts thereof.

11. The method of claim 10, wherein the aminopolycarboxylic acids are ethylenediaminetetraacetic acids (EDTA).

12. The method of claim 10, wherein the iron chelating agent I is ethylenediaminetetraacetic acid disodium salt (Na$_2$EDTA) and the iron chelating agent II is ethylenediaminetetraacetic acid tetrasodium salt (Na$_4$EDTA).

* * * * *